June 4, 1929.  A. ANDERBERG ET AL  1,715,810
FLUID PRESSURE BRAKE SYSTEM
Filed Dec. 28, 1927      2 Sheets-Sheet 1
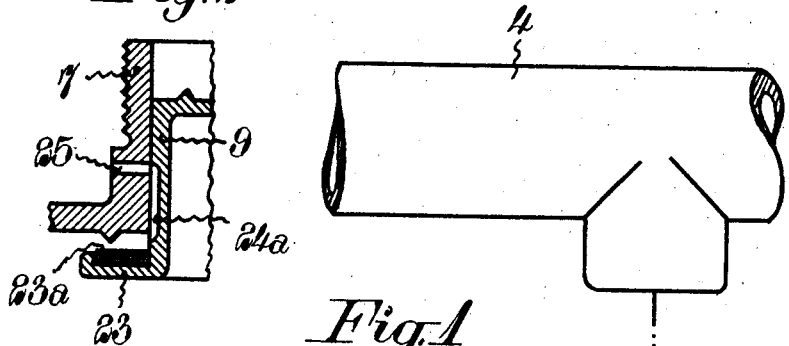
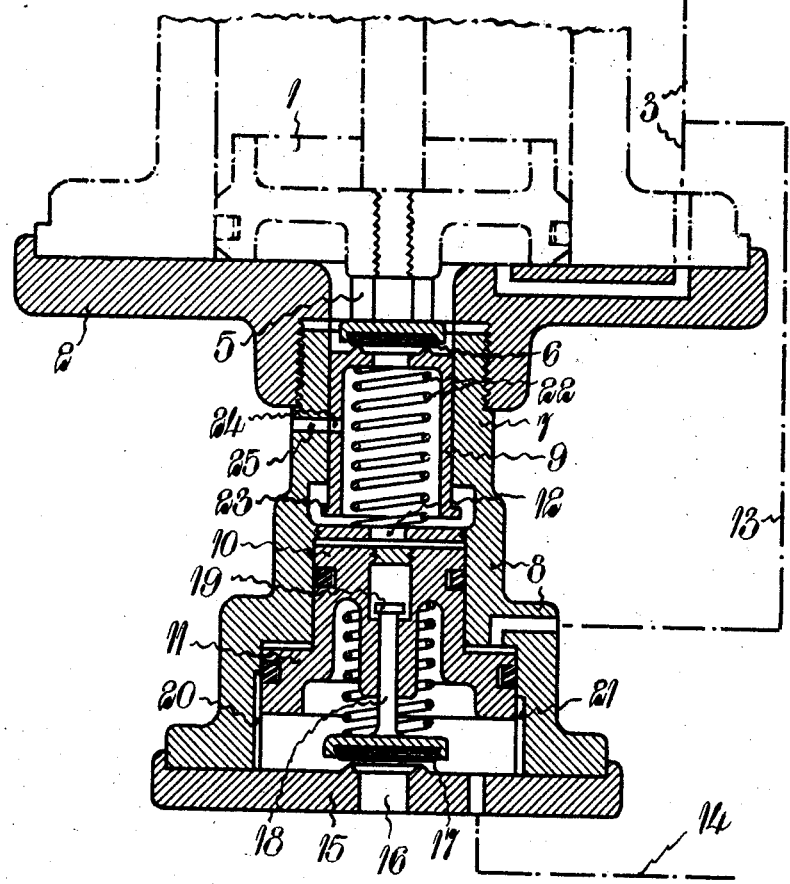
Inventors:
Anders Anderberg
and Erik Anders Anderberg
Attorney

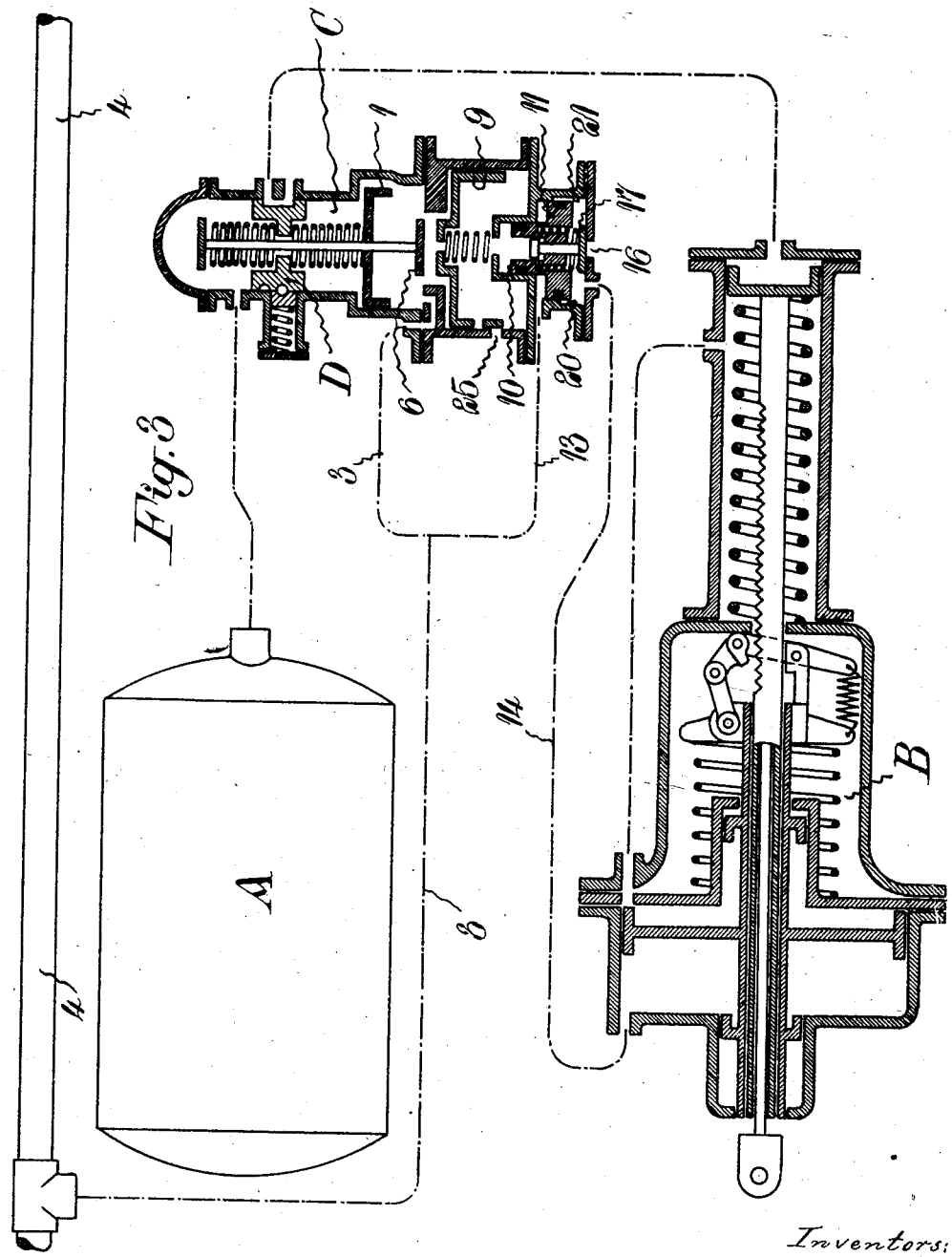

Patented June 4, 1929.

1,715,810

UNITED STATES PATENT OFFICE.

ANDERS ANDERBERG AND ERIK ANDERS ANDERBERG, OF MALMO, SWEDEN, ASSIGNORS TO CARL HOLMBERGS MEKANISKA VERKSTADS AKTIEBOLAG, OF LUND, SWEDEN, A CORPORATION OF SWEDEN.

FLUID-PRESSURE BRAKE SYSTEM.

Application filed December 28, 1927, Serial No. 243,134, and in Germany August 5, 1927.

A number of different air brake systems are used for the mechanical braking of railway trains throughout, most of which systems have in common the feature that braking is obtained by reduction in pressure within a main pipe common to all brakes in the train. If the pressure within said main pipe, when driving the train with released brakes, is for instance 5 atmospheres, it is desired that the brake shoes shall be brought in contact with the wheels upon a reduction in pressure within the main pipe from the said 5 atmospheres to about 4.8 atmospheres, and in Europe it has been adopted as a general rule that the brake shoes shall be brought in contact with the wheels upon a reduction in pressure of 10 per cent (the so-called Berne program, section 19). In single-chamber air brakes and modifications thereof this result is obtained rather easily, but in two-chamber air brakes of the type hitherto used it is impossible to obtain a complete advance of the brake shoes towards the wheels for such a small reduction in pressure within the main pipe as, for instance, from 5 to 4.8 atmospheres, this being especially true in the case of worn brake shoes. In order to obtain so long a stroke of the piston in a two-chamber air brake as required for advancing the brake shoes into contact with the wheels, say, for instance, ten inches, the pressure within the function chamber of the brake cylinder, which chamber is directly connected to the main pipe, must be reduced from for instance 5 atmospheres down to 3.0–3.5 atmospheres.

From the foregoing it will be evident that if railway cars, usually freight cars, equipped with, for instance, the known single-chamber air brakes are to be used in the same train as other cars equipped with two-chamber air brakes, a full braking effect will be obtained on the cars equipped with single-chamber air brakes before the brake shoes on the cars equipped with two-chamber air brakes have come in contact with the wheels. Hence, such violent jerks and shocks will arise in the train that the couplings between the cars or the pull rod rigging in general cannot withstand them.

The substantial difference in the brake curves of the two brake systems in question thus forms a direct obstacle to the transportation traffic, and our present invention has for its object to remove this obstacle by means of a quite simple valve structure and to obtain substantial co-incidence between the brake curve of the two-chamber air brake and that of the single-chamber air brake, as well at the advance of the shoes and the braking as at the release of the brakes, or in other words to accelerate the advancing and releasing movements of the two-chamber air brake in such a manner that said movements are completely effected for the same small reduction in pressure within the main pipe which is sufficient for the corresponding movements of the single-chamber air brake.

The invention is applicable as well to two-chamber air brakes of common types as to the modification thereof referred to in our prior Patent, No. 1,663,579, granted March 27, 1928. In brakes of this last-mentioned type, it is, however, not necessary to use the improvement according to the present invention in order to obtain a rapid advancing movement of the brake shoes towards the wheels, since a movement of the same rapidity will in spite thereof be obtained by the quick-action operating device referred to in said patent. Nevertheless the invention may be found useful in that connection also for obtaining a greater braking effect than the effect answering directly to the difference in pressures within the working and the function chambers. This quality of the device according to our prior patent referred to above will result in a substantially lessened air consumption on account of the fact that a full braking effect is obtained without the necessity of completely emptying the main pipe.

The invention is illustrated in the accompanying drawings, which show a preferred embodiment thereof. Fig. 1 is a view of the valve structure in axial vertical section and Fig. 2 in the same manner shows a modification of a detail to be more minutely described below. Fig. 3 is a diagrammatical view of the invention applied to a two-chamber air brake of the type described in our aforesaid patent, but it is to be understood that the triple-valve is drawn to a larger scale than the rest of the figure.

For making it possible to apply the invention to an air brake, the same must be provided with a reciprocable piston, or an oscillating diaphragm or the like, one side of which is acted upon by the pressure within the main pipe, a closed chamber of suitable volume being arranged on the opposite side.

In common two-chamber air brakes a piston or the like of this kind is not present, but in the modified form of two-chamber air brakes referred to in our said patent, it may consist (though not necessarily) of the control piston of the triple valve. The said triple-valve piston fulfills, however, the conditions outlined above, since on one side it is acted upon by the main pipe pressure and on the other side it is in communication with the working chamber of the brake and with the auxiliary air reservoir. In this modified form of two-chamber air brake the stroke volume of the triple-valve piston is, however, so small that the closed chamber at one side of the piston (or diaphragm) might very well be a container of about one liter volume only. In the usual two-chamber air brake the piston or its equivalent must form a part of the valve structure according to the invention, and the closed chamber at one side of the same may be connected to the working chamber of the brake or to a closed container of suitable volume.

The piston thus available, whether it is the triple-valve control piston or is of another kind, ought besides to be arrested at least in one of its end positions, i. e., the end position taken when the brakes are released, which is the postion into which the piston travels upon an increase of pressure within the main pipe.

For the sake of simplicity it may be assumed in the following that it is the triple-valve control piston of the brake referred to in our aforesaid patent which is available for the purpose of the present invention, said piston being designated 1 in Fig. 1. The bottom end of the cylinder is closed by means of a cover 2 and the space beneath the piston is connected to the main pipe 4 by piping 3 (shown diagrammatically); the space above the piston may be assumed to be connected with the auxiliary air reservoir or to form in itself the closed chamber referred to above. As will be seen from the following description of the mode of operation of the device the piston is intended to be utilized simultaneously both as a striking member and as a valve, and at the under side (the side acted upon by the main-pipe pressure) the piston is provided with a head 5 carrying a packing 6 consisting, for instance, of leather.

The cover 2 is provided with a central aperture to be freely penetrated by the valve head 5 and said aperture stands in communication with a valve housing comprising two parts, i. e., a cylinder 7 nearest to the cover 2 and enclosing a slide valve 9 to be described later and another cylinder 8 positioned as an extension of the cylinder 7. The cylinder 8 encloses a differential piston, the part of which having the smaller diameter being designated 10 and the part having the larger diameter being designated 11. By means of an aperture 12 (formed in a partition between the two cylinders 7 and 8) the cylinder 7 is kept in open communication with that part of the cylinder 8 having the smaller diameter; and the chamber at the small annular surface of the piston 11, which is due to the difference in diameter of the two parts forming the same as a whole, is subjected by means of connecting piping 13 (shown diagrammatically), to the influence of the pressure within the main pipe 4. By means of piping represented by the dot and dash line 14 the part of the cylinder 8 of larger diameter remains in constant connection with the function chamber of the brake. The cover 15 closing the part of the cylinder 8 having the larger diameter is provided with an opening 16 adapted to be closed by a disc valve 17 (provided with leather packing), said valve being acted upon by a spring resting against the piston 10, 11. The valve 17, which coacts with a seat surrounding the opening 16, has a spindle 18 carrying a head 19 positioned between abutment surfaces on the piston 10, 11 for limiting the free movement of the valve 17 in such a way that said valve, in spite of the closing spring, is moved by means of the piston into open position when the piston has travelled into its uppermost position (the position shown in the drawing), but that the piston is not prevented from a continued downward movement even after the valve 17 has been closed.

The cylinder 8 is provided with by-pass means between the chambers at the opposite sides of the piston 11 and said means are preferably constructed in the form of so-called feed-grooves, one or more of which grooves 20 are longer than the other grooves 21. No groove is so long, however, that the by-pass is established before the valve 17 has been moved into closing position.

The slide valve 9 is made in the form of a sleeve acted upon by a spring 22 so as to move in a direction towards the piston 1 and the valve 6, against which latter the slide valve forms a suitable seat. The slide valve 9 is provided with suitable abutments 23 for limiting the upward movement of the same, and the side wall of said valve is provided with one of more ports 24 for coaction with corresponding ports 25 in the cylinder 7, when the slide valve, by pressure from the piston 1, is moved down under compression of the spring 22. The downward movement of the piston 1 is limited in such a way that it cannot push down the slide valve 9 so far that the ports 24, 25 are closed again by further movement in that direction, but a closing of said ports is effected by means of the spring 22 when the piston 1 moves upwardly.

Fig. 2 shows a modification of the slide valve and the cylinder surrounding the same, having for its object to obtain a better tightening (larger tightening surfaces) between the interior of the slide valve 9 and the atmosphere. In this modification the port 24 is replaced by a groove or cavity 24ª in the outer surface of the slide valve, such groove being intended for coaction with the port 25. The groove 24ª extends towards the abutment 23 which latter is provided with a suitable packing 23ª (leather) and forms a valve coacting with a seat on the cylinder 7. This arrangement will, of course, act in the same manner as that described above, but when the slide valve moves into a position for closing the port 25, larger tightening surfaces and a double tightening are obtained by means of the valve flange 23ª on that side where the tightening surface must otherwise by necessity be the smallest.

The operation of the valve structure is as follows:

On reducing the pressure within the main pipe 4 for the purpose of braking, the piston 1 will begin a downward movement and after release of its arresting means the valve 5 will first be closed, whereupon the slide valve 9 is pushed down into the position shown in the drawing so that the air enclosed within the interior of the sleeve-shaped slide valve, by means of the ports 24, 25 then registering, will escape to the atmosphere. Thus, atmospheric pressure will be present on the upper side of the piston 10 due to the aperture 12, and the excess pressure within the function chamber of the brake cylinder, which pressure acts upon the under side of the piston 11, will cause the piston 10, 11 to travel upwardly into the position shown in the drawing, whereby the valve disc 17 will be raised, so that the air within the function chamber of the brake cylinder will escape to the atmosphere, until the pressure within said chamber has been reduced in proportion to the difference in size between the opposite surfaces of the piston 11, when the valve 17 will be closed again. If, thereafter, the pressure within the main pipe 4 be further reduced, the pressure within the function chamber of the brake cylinder will be reduced accordingly, but if the pressure within the main pipe is raised, the piston 11 will be pressed down, so that the by-pass grooves 20 and 21 are successively opened, whereby air from the main pipe will flow into the function chamber of the brake cylinder and increase the pressure therein in proportion to the difference in size between the piston areas.

If a complete release of the brake shoes is to be effected, the pressure within the main pipe is raised to its original value, whereupon the piston 1 begins its upward movement. The slide valve 9 at first will join in said upward movement, due to the action of its spring 22, until the ports 24, 25 are closed, whereupon the air from the main pipe 4 will flow through the opened valve 5 into the sleeve-shaped slide valve 9, so that the pressure prevailing within the main pipe will act upon the piston 10 and push the differential piston 10, 11 downwardly. Then the air from the main pipe by means of the by-pass grooves 20, 21 will flow into the function chamber of the brake cylinder until the pressure within the latter has assumed the same value as the pressure within the main pipe.

Of course the device may also be constructed in such a way that it may be set out of action, for instance, by suitably positioned cocks or the like, so that a direct communication between the main pipe and the function chamber of the brake cylinder can be permanently obtained.

In case of common two-chamber air brakes, the pressure on the upper side of the piston 1 may be the same as the pressure within the working chamber of the brake cylinder, or else the space at that side of the piston may be given the form of a closed chamber or container of suitable volume, as stated above, which may be intermittently connected by means of feed-grooves in known manner with the space at the under side of the piston, so that the said chamber or container thus acts as a working chamber for the arrested piston.

The arresting means coacting with the piston 1 and referred to in the foregoing has for its object to cause the piston to move in such a way, especially downwardly, as to produce a depression of the slide valve as rapidly as possible when such depression has to take place, i. e., the piston has to establish the differential action as rapidly as possible. By arresting the piston 1 the movement of the same will also be caused to take place simultaneously on all of the cars in a whole train, and the function of the valve structure as a whole will be independent of air waves or the like within the main pipe.

It will be evident from the foregoing and by comparison with the drawing, according to which the invention is assumed to be applied to the triple-valve of the brake shown in our aforesaid prior patent, that the arrangement is very simple and small in size on account of the fact that the control piston of the triple-valve in this instance has a very small stroke volume. In such cases, however, where it is desired to apply the invention to another valve forming part of an air brake system of another kind, in which the piston 1 has a large stroke volume, which volumes are added throughout the whole train and will cause an unfortunate increase in pressure at the opening movement, the arrangement will be equally simple in construction, but it may be advisable to utilize greater dimensions, so that the diameter of the slide valve 9 is the same as, or even somewhat greater than the diameter of the piston 1 in order to eliminate such increases in pressure which otherwise can add together when braking.

It is also obvious that the invention, when actually used in practice, need not be constructed exactly in the manner described above and shown in the drawing, and especially the means for transferring the movement of the piston 1 to the slide valve 9 and the construction of this valve and the means for transmitting the movement from the same to the differential piston 10, 11 and the valve disc 17 may be modified in many ways without departing from the invention or interfering with the function of the structure as a whole, although the embodiment shown and described for several reasons, especially constructional simplicity, is to be considered suitable.

In the application of the invention in practice, shown diagrammatically in Fig. 3, the same reference numerals are used as in the figures just described. In addition, A represents the auxiliary reservoir, B the brake and C the triple valve provided with the arresting means D referred to above and described in our said prior patent. The connecting conduits are shown in dot and dash lines and need not be described further in this connection. With regard to Fig. 3 it is to be noted that the stroke volume of the slide valve 9 is equal to or somewhat greater than the stroke volume of the piston 1 and therefore a movement of a great number of such pistons, in case of long trains, will not increase the pressure within the main pipe 4 once lowered for the purpose of braking; but upon displacement of the valve 9 and escape of the air beneath the same, the stroke volume of the piston 1 will be equalized, and during braking the pressure within the main pipe will not be increased on account of the stroke volumes of the several pistons 1 which are set in action due to the decrease in pressure within the main pipe which causes the braking.

Although the invention according to Fig. 3, for the sake of explanation, is shown in connection with the brake according to our patent, it will be obvious to anyone skilled in the art that it may also be applied to compressed air brakes of any other kind with the same advantage. The acceleration of the two-chamber air brake piston will be just the same whether the brake is of one type or the other, and the elimination of the stroke volume of the triple-valve control piston will also be obtained exactly in the same manner.

What we claim and desire to secure by Letters Patent is:—

1. An air brake system, comprising a two-chamber air brake cylinder, a piping connecting the function chamber of said brake cylinder with a main brake pipe extending along the train, a valve structure interposed in said piping for temporarily connecting the said function chamber with the atmosphere upon a decrease in pressure within the main pipe, differential controlling means for said valve structure, actuating means for establishing the differential action upon a slight decrease in pressure within the main pipe.

2. In an air brake system embodying a two-chamber brake cylinder, a valve structure for establishing communicaton between the function chamber of the brake cylinder and the atmosphere, comprising: a reciprocable actuating means for said valve structure acted upon at one side by the pressure within the main pipe, the space at the other side forming a working chamber, valve means for opening communication between the atmosphere and the interior of the valve structure, a reciprocable differential control piston, the part of smaller diameter of which is normally acted upon by the pressure within the main pipe but which may be exposed to atmospheric pressure by said valve means, a valve coacting with the aforementioned valve means for interrupting communication between the main pipe and the part of smaller diameter of the differential piston before the said part is exposed to the atmosphere, means for connecting the space at one side of the part of larger diameter of the piston with the said function chamber, by-pass means between both sides of the said part of larger diameter, which by-pass means are opened upon the displacement of the piston due to an increase in pressure within the main pipe, and valve means for exposing the part of larger diameter of the differential piston and the function chamber of the brake cylinder to the atmosphere upon a decrease in pressure within the main pipe.

3. In an air brake system embodying a two-chamber brake cylinder, a valve structure for establishing communication between the function chamber of the brake cylinder and the atmosphere, comprising: a reciprocable actuating means for said valve structure acted upon at one side by the pressure within the main pipe and arrested at least in that end position to which it is carried by an increase in said pressure, the space at the other side forming a working chamber, valve means for opening communication between the atmosphere and the interior of the valve structure, a reciprocable differential control piston, the part of smaller diameter of which is normally acted upon by the pressure within the main pipe but which may be exposed to atmospheric pressure by said valve means, a valve coacting with the aforementioned valve means for interrupting communication between the main pipe and the part of smaller diamter of the differential piston before the said part is exposed to the atmosphere, means for connecting the space at one side of the part of larger diameter of the piston with the said function chamber, by-pass means between both sides of the said part of larger diameter, which by-pass means are opened upon the displacement of the piston due to an increase in pressure within the main pipe, and valve means for exposing the part of larger diameter of the differential piston and the function chamber of the brake cylinder to the atmosphere upon a decrease in pressure with the main pipe.

4. In an air brake system embodying a two-chamber brake cylinder, a valve structure for establishing communication between the function chamber of the brake cylinder and the atmosphere, comprising: a reciprocable actuating means for said valve structure acted upon at one side by the pressure within the main pipe, the space at the other side forming a working chamber, valve means for opening communication between the atmosphere and the interior of the valve structure, a reciprocable differential control piston, the part of smaller diameter of which is normally acted upon by the pressure within the main pipe but which may be exposed to atmospheric pressure by said valve means, a valve coacting with the aforementioned valve means for interrupting communication between the main pipe and the part of smaller diameter of the differential piston before the said part is exposed to the atmosphere, means for connecting the space at one side of the part of larger diameter of the piston with the said function chamber, by-pass means between both sides of the said part of larger diameter, which by-pass means are successively opened upon a displacement of the piston due to an increase in pressure within the main pipe, and valve means for exposing the part of larger diameter of the differential piston and the function chamber of the brake cylinder to the atmosphere upon a decrease in pressure within the main pipe, such valve means being positively controlled by the piston in such a manner that the by-pass means are closed before the communication with the atmosphere is established.

5. In an air brake system embodying a two-chamber brake cylinder, a valve structure for establishing communication between the function chamber of the brake cylinder and the atmosphere, comprising: a reciprocable actuating means for said valve structure acted upon at one side by the pressure within the main pipe, the space at the other side forming a working chamber, valve means for opening communication between the atmosphere and the interior of the valve structure, a reciprocable differential control piston, the part of smaller diameter of which is normally acted upon by the pressure within the main pipe but which may be exposed to atmospheric pressure by said valve means, a valve coacting with the aforementioned valve means for interrupting communication between the main pipe and the part of smaller diameter of the differential piston before the said part is exposed to the atmosphere, means for connecting the space at one side of the part of larger diameter of the piston with the said function chamber, by-pass means between both sides of the said part of larger diameter, which by-pass means are successively opened upon a displacement of the piston due to an increase in pressure within the main pipe, valve means for exposing the part of larger diameter of the differential piston and the function chamber of the brake cylinder to the atmosphere, which means are positively controlled by the said piston for the opening movement after closing of the by-pass means, and means for closing the last-mentioned valve means without interfering with the continued movement of the piston for the purpose of opening the by-pass means.

6. In an air brake system embodying a two-chamber brake cylinder, a valve structure for establishing communication between the function chamber of the brake cylinder and the atmosphere, comprising: a reciprocable actuating means for said valve structure acted upon at one side by the pressure within the main pipe, the space at the other side forming a working chamber, a sleeve-shaped slide valve reciprocably positioned within a corresponding cylinder and forming a channel through the same, a reciprocable differential control piston, the part of smaller diameter of which normally communicates by way of the slide valve with the main pipe, the slide valve and the surrounding cylinder having coacting ports for providing communication with the atmosphere upon the displacement of said valve, means for effecting a reverse displacement of the slide valve to close said ports, valve means controlled by the actuating means and coacting with the slide valve for closing the channel through the latter, means for connecting the space at one side of the part of larger diameter of the piston with the function chamber of the brake cylinder, by-pass means between both sides of the said part of larger diameter, which by-pass means is opened upon the displacement of the piston due to an increase in pressure within the main pipe, valve means for exposing the part of larger diameter of the differential piston and the function chamber of the brake cylinder to the atmosphere, and means for closing said last-mentioned valve means previous to the opening of said by-pass means.

7. In an air brake system embodying a two-chamber brake cylinder, a valve structure for establishing communication between the function chamber of the brake cylinder and the atmosphere, comprising: a reciprocable actuating piston acted upon at one side by the pressure within the main pipe, the space at the other side forming a working chamber, a sleeve-shaped slide valve reciprocably positioned within a corresponding cylinder and arranged substantially in axial alignment with the actuating piston at that side of said piston which is acted upon by the pressure within the main pipe, a differential cylinder arranged substantially in axial alignment with the first-mentioned cylinder and in permanently open communication with the same, a reciprocable differential piston positioned in the last-mentioned cylinder, the part of smaller diameter of said piston being normally in communication with the main pipe by way of the slide valve, said slide valve and the surrounding cylinder having coacting ports for exposing the interior of the slide valve to the atmosphere, means for effecting a reverse displacement of the slide valve to close said ports, a seat arranged on the slide valve in the path of movement of the actuating piston, valve means on said actuating piston for coaction with said seat in order to close the channel through the slide valve, means for connecting the space at one side of the part of larger diameter of the differential piston with the function chamber of the brake cylinder, by-pass means between both sides of the said part of larger diameter, which by-pass means is opened upon the displacement of the piston due to an increase in pressure within the main pipe, valve means controlled by the movements of the differential piston and adapted to expose the part of larger diameter of the same and the function chamber of the brake cylinder to the atmosphere, and means for closing the last-mentioned valve means previous to the opening of said by-pass means.

In testimony whereof we have signed our names to this specification.

ANDERS ANDERBERG.
ERIK ANDERS ANDERBERG.